United States Patent
Ackermanns et al.

(10) Patent No.: US 7,115,200 B2
(45) Date of Patent: Oct. 3, 2006

(54) DEVICE FOR RECEIVING AND SEPARATING CHIPS CREATED BY MACHINE-TOOLS AND COOLANT (DRIVE)

(75) Inventors: Leo J. P. Ackermanns, Schin op Geul (NL); Wim R. E. Arnts, Kerkrade (NL); Rene M Sieben, Sittard (NL); Rimmond H. B. Souren, Meersen (NL)

(73) Assignee: Mayfran International B. V., Landgraaf (NL)

( * ) Notice: Subject to any disclaimer, the term of this patent is extended or adjusted under 35 U.S.C. 154(b) by 48 days.

(21) Appl. No.: 10/492,285

(22) PCT Filed: May 19, 2003

(86) PCT No.: PCT/EP03/05245

§ 371 (c)(1),
(2), (4) Date: Apr. 9, 2004

(87) PCT Pub. No.: WO03/099513

PCT Pub. Date: Dec. 4, 2003

(65) Prior Publication Data

US 2005/0061727 A1    Mar. 24, 2005

(30) Foreign Application Priority Data

May 24, 2002   (DE)   ................................. 102 23 290

(51) Int. Cl.
*B23Q 11/00*    (2006.01)
*B01D 33/06*    (2006.01)
*B01D 33/073*   (2006.01)
*B01D 36/04*    (2006.01)

(52) U.S. Cl. .................. 210/297; 210/298; 210/402
(58) Field of Classification Search ............ 210/297, 210/298, 402
See application file for complete search history.

(56) References Cited

U.S. PATENT DOCUMENTS

| | | | | |
|---|---|---|---|---|
| 4,421,645 | A | * | 12/1983 | Creps et al. ................. 210/260 |
| 5,167,839 | A | * | 12/1992 | Widmer et al. ............. 210/784 |
| 5,871,643 | A | | 2/1999 | Ota |
| 6,332,983 | B1 | | 12/2001 | Tashiro et al. |

FOREIGN PATENT DOCUMENTS

| | | | |
|---|---|---|---|
| JP | 09-075622 A | * | 3/1997 |
| JP | 2000-167317 A | * | 6/2000 |
| JP | 2000 202215 A | | 7/2000 |
| JP | 2000 300914 A | | 10/2000 |
| JP | 2002 102608 A | | 4/2002 |

OTHER PUBLICATIONS

International Search Report PCT/EP 03/05245, dated Aug. 12, 2003.

* cited by examiner

*Primary Examiner*—Thomas M. Lithgow
(74) *Attorney, Agent, or Firm*—Calfee, Halter & Griswold, LLP

(57) ABSTRACT

The invention relates to a device for receiving and separating chips and cooling liquid collecting on machine tools, in which a transport element is guided along a filter drum at a radial distance from the latter on guide rails, and cooperating driver elements acting only in the circumferential direction on the filter drum and arranged in each case at a distance from one another are provided on the transport element and on the filter drum.

15 Claims, 6 Drawing Sheets

DEVICE FOR RECEIVING AND SEPARATING CHIPS CREATED BY MACHINE-TOOLS AND COOLANT (DRIVE)

The invention relates to a device for receiving and separating chips and cooling liquid collecting on machine tools, the cooling liquid being returned for reuse and the chips being discharged, having a receiving tank for receiving the chips and the cooling liquid, a rising guide section adjoining the receiving tank, an elevated delivery section adjoining the guide section, a chain-like closed transport element which, at least in the region receiving the chips and the cooling liquid and in the delivery section, is guided via deflecting elements, of which at least one is coupled to a rotary drive, and a rotatably mounted filter drum which is in drive connection with the transport element.

In a known device of this type (U.S. Pat. No. 6,332,893), a transport element is directed partly around the filter drum and directly causes this drum to rotate in the process. It follows from this that the bearings of the drum are radially loaded by the transport element, that is to say that the wear on these bearings increases. Furthermore, as a result of the direct drive connection between transport element and filter drum, the circumferential speed of the filter drum must always correspond to the speed of the transport element.

The object of the present invention, then, is to reduce the bearing load of the filter drum in a device of the type mentioned at the beginning and to make it possible for a filter cake to form on the outside on the circumference of the drum despite a continuously revolving transport element, this filter cake positively influencing the filter effect.

This object is achieved according to the invention in that the transport element is guided along the filter drum at a radial distance from the latter on guide rails, and in that cooperating driver elements acting only in the circumferential direction on the filter drum and arranged in each case at a distance from one another are provided on the transport element and on the filter drum.

In this case, the pressure exerted during the deflection of the transport element in the region of the filter drum is absorbed by the guide rails and the bearings of this drum are relieved. At the same time, the filter drum does not automatically follow the movement of the transport element.

On the contrary, the arrangement of the cooperating driver elements on the filter drum on the one hand and on the transport element on the other hand determines the phases in which a rotation takes place and, on the other hand, in which the filter drum is stopped. During these stop periods, a filter cake can form in a perfectly desirable manner on the lateral surface of the filter drum, this filter cake increasing the filter effect. In a manner known per se, this filter cake can be dissolved from the inside of the filter drum by jets of filtered cooling liquid in order not to allow the thickness of the filter cake formed to increase too much.

The driver elements on the filter drum are expediently designed as projecting pins and the driver elements on the transport element are expediently designed as projecting stops cooperating with the pins.

Furthermore, provision is made according to the invention for the driver elements to have a crank mechanism, the crank of which is in drive connection 35 with the transport element and the rod of which carries a driver element which engages in the tooth system of a ratchet wheel coupled to the filter drum. In this case, the crank radius of the crank mechanism can be adjustable. As a result, the angle by which the filter drum is advanced during a revolution of the crank can be determined.

Both drive variants can in each case be attached on one side or on both sides of the filter drum. On the one hand, the circumferential speed can be increased by the drives alternately driving the drum on both sides; on the other hand, torsional forces are avoided during synchronous drive of both drum sides.

Furthermore, the device according to the invention may be designed in such a way that the transport element is a scraper chain guided at its two sides in the housing of the device and having scraper webs running transversely to the transport direction and projecting downwards in the region of the bottom strand.

Furthermore, the invention provides for the transport element to be a hinged belt conveyor guided at its two sides in the housing of the device and having supporting sections running transversely to the transport direction.

A few embodiments of the device according to the invention are described below with reference to drawings, in which:

FIG. 1 shows a side view of a device according to the invention having a scraper chain, FIG. 2 shows a side view of a device according to the invention having a hinged belt conveyor, FIG. 3 shows a detail view of a filter drum in combination with a scraper chain, FIG. 4 shows a detail view of a filter drum in combination with a hinged belt conveyor, FIG. 5 shows an axial section through a filter drum designed according to the invention for drum drives according to FIGS. 3 and 4, FIG. 6 shows a detail view of a further embodiment with crank drive of the filter drum in combination with a scraper chain, FIG. 7 shows a detail view of a further embodiment with crank drive of the filter drum in combination with a hinged belt conveyor, FIG. 8 shows an axial section through a filter drum designed according to the invention with a drum drive in accordance with the embodiments according to FIG. 6 or 7.

FIG. 1 shows the side view of an embodiment of the device according to the invention having a receiving tank 1 which is open at the top and which receives chips and cooling liquid collecting on machine tools. This receiving tank has an overflow edge 2. Adjoining the receiving tank is a rising guide section 3, which merges into an elevated delivery section 4.

Here, a scraper chain roller-guided on both sides is provided as transport element. This scraper chain is guided around a bottom deflecting element 6 at the end of the receiving tank 1 and runs in the region of the delivery section 4 around a top deflecting element 7, which is coupled to a drive (not shown). It carries scraper elements which are arranged at a distance apart and which project downwards in the region of the bottom strand, that is to say in the direction of the bottom of the receiving tank 1, or towards the side wall 10 of the rising section 3. The transport direction of the scraper chain 1 is indicated by the arrow 11.

A filter drum 12 which is rotatably mounted in the housing of the device is provided. The scraper chain runs around the filter drum at a radial distance which is determined by a guide rail 13. Driver elements are provided on the scraper chain 5 and on the filter drum 12, these driver elements gradually advancing the filter drum 12 intermittently during operation of the device.

The embodiment according to FIG. 2 differs from that according to FIG. 1 merely in the fact that the transport element used is a hinged belt 14 instead of a scraper belt, this hinged belt 14, in contrast to a scraper belt, receiving and carrying the material to be transported on its top side. In this case, the hinged belt 14 is covered on the underside of its top strand with a baffle 8.

FIG. 3 shows pins 20 which are arranged equidistantly on the filter drum 12 and cooperate with stops 21 which 15 are fastened to the scraper chain 5.

Furthermore, the web-shaped scraper elements 9 and the stops 21 may form a constructional unit.

FIG. 4 shows an embodiment according to FIG. 3 with a hinged belt 14.

FIG. 5 shows a section through a filter drum 12 having a hinged belt 14, the lateral rollers 22 of which run in guides 23. Furthermore, of the hinged belt 14, a retaining rod 24 is shown, on which a web-like scraper element 9 projecting downwards sits. The filter drum 12 is of identical design towards its two ends and is rotatably mounted in the housing of the device. It is open on both sides and therefore forms on both sides an outlet for the cleaned cooling liquid passed through the filter wall 25.

The embodiment according to FIG. 6 differs from that described with reference to FIGS. 3 and 4 in that the driver elements are formed by a crank mechanism 26. This mechanism has a gearwheel 27 which is rotatable about a fixed axis (not shown). In this case, the gearwheel engages between the rollers of the scraper chain 5, which interacts at the rear with a support 28, so that the scraper chain 5 cannot give way to the action of the gearwheel 27.

A crank pin 29 sits on the gearwheel 27 eccentrically to the axis of the gearwheel and carries a push rod 30, and sitting in turn on the end of the latter is a driver element 31, which engages in the tooth system of a ratchet wheel 32.

During operation of the scraper chain 5, the rotation of the gearwheel 27, via the crank pin 29, successively causes the ratchet wheel 32 to advance by at least one tooth in each case during each complete rotation of the gearwheel 27.

By radial displaceability of the crank pin 29 in the gearwheel 27, the stroke of the toothed rack [sic] 30 can be varied, so that the ratchet wheel 32 can be moved by more than one tooth during a rotation of the gearwheel 27.

A particular advantage of this embodiment can be seen in the fact that, here, all the elements for the gradual advance of the filter drum are accommodated in a region of the device in which contamination can be expected only to a relatively small extent.

LIST OF DESIGNATIONS

Figure 1:
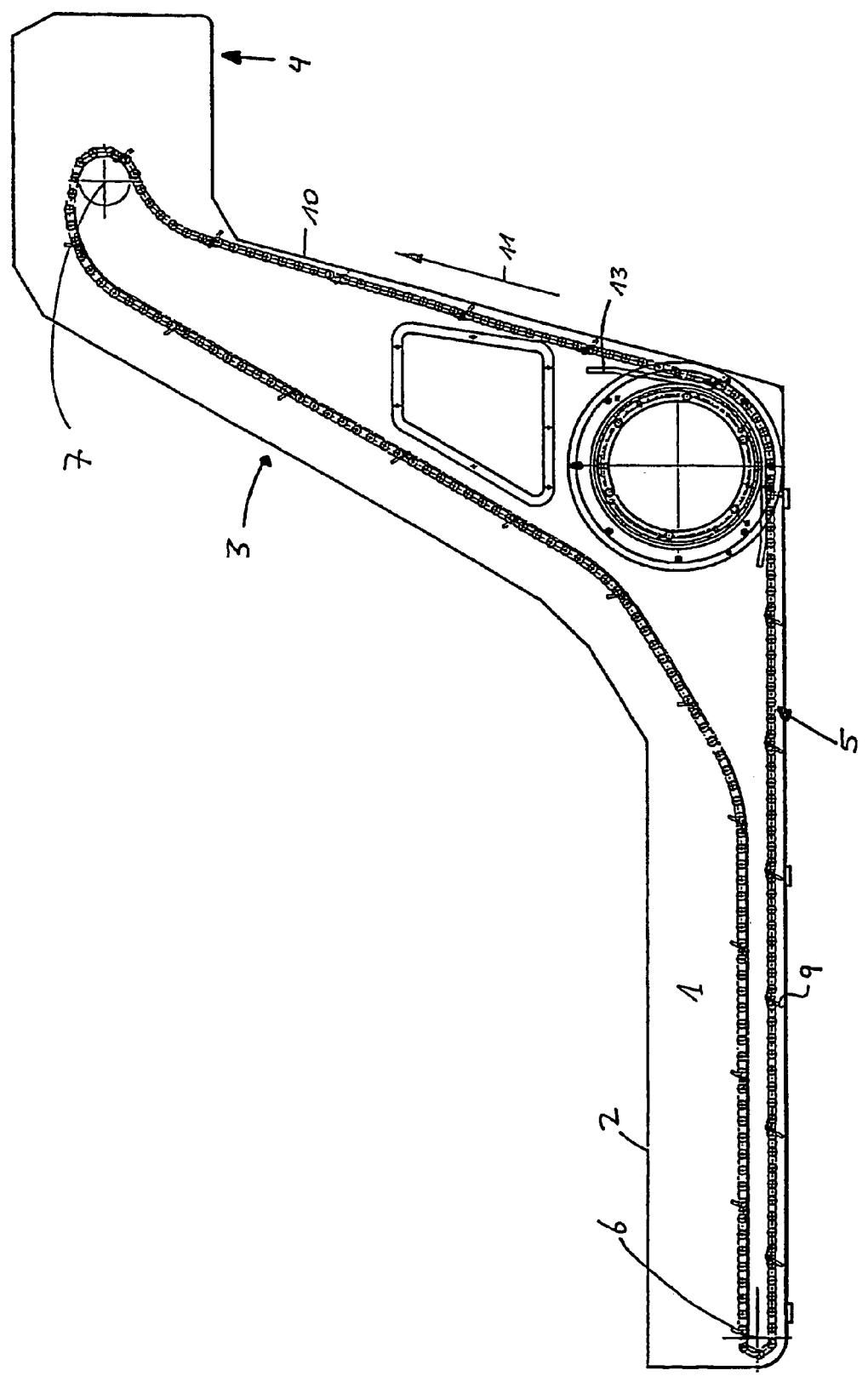
Figure 2:
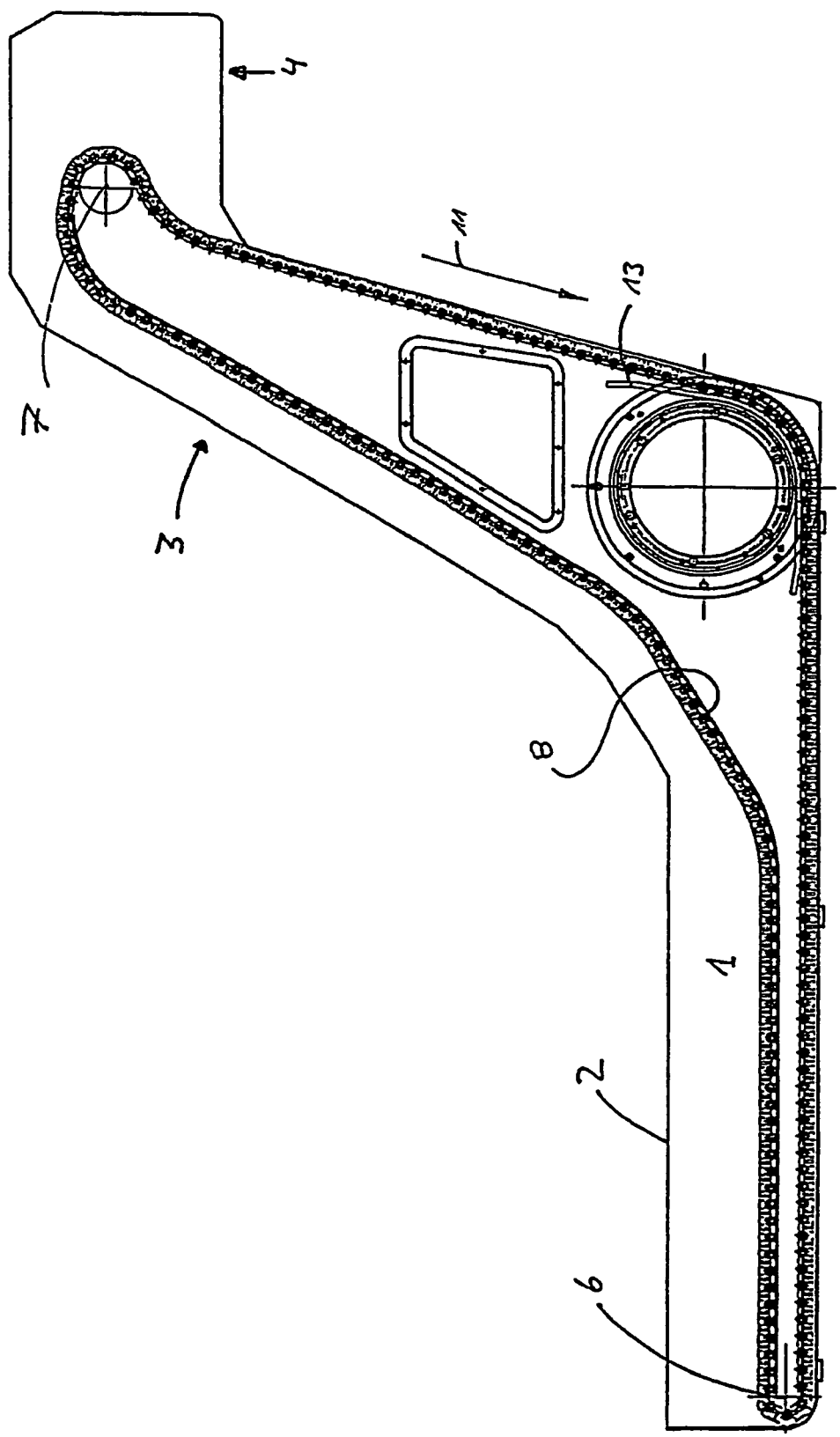
Figure 3:
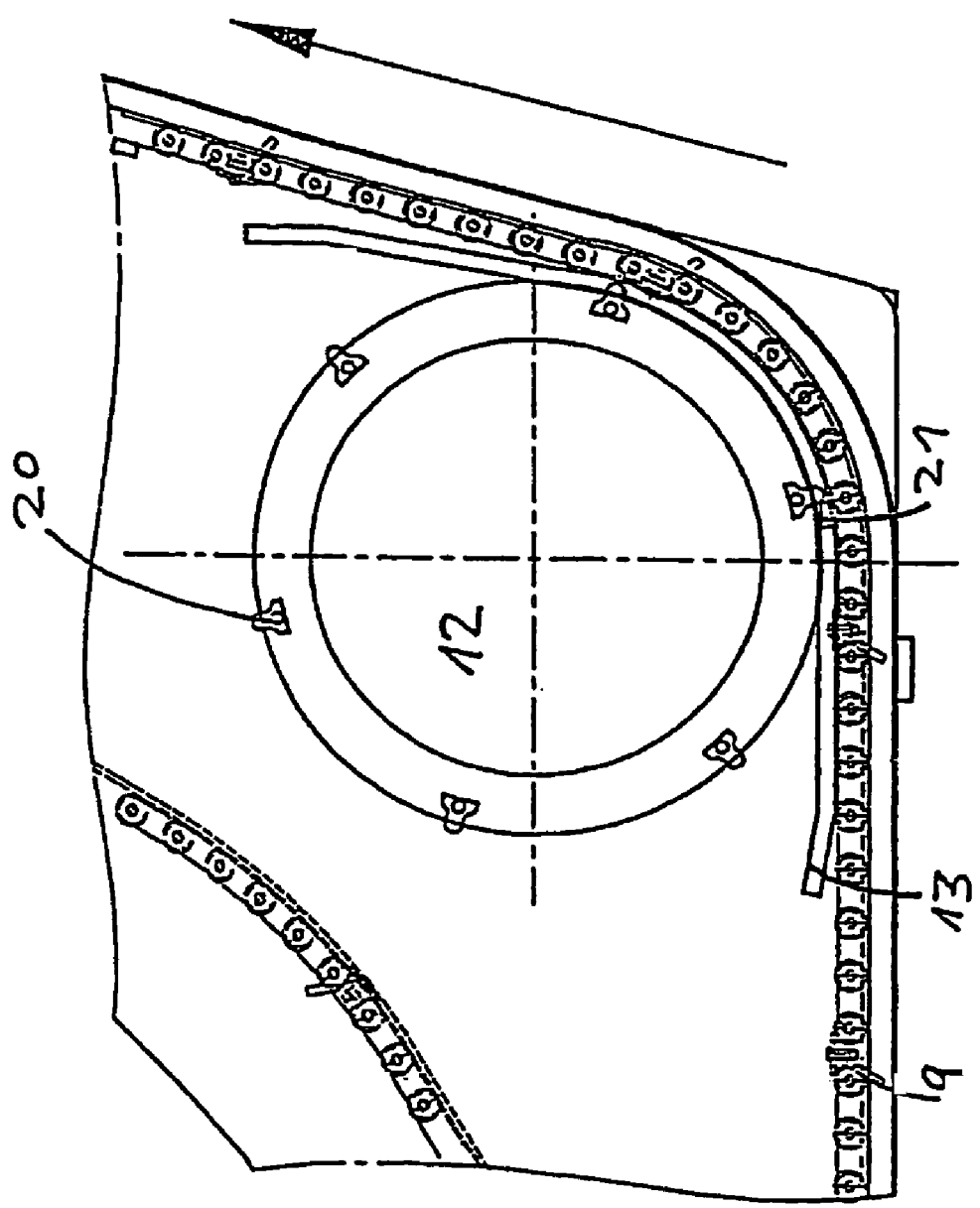
Figure 5:
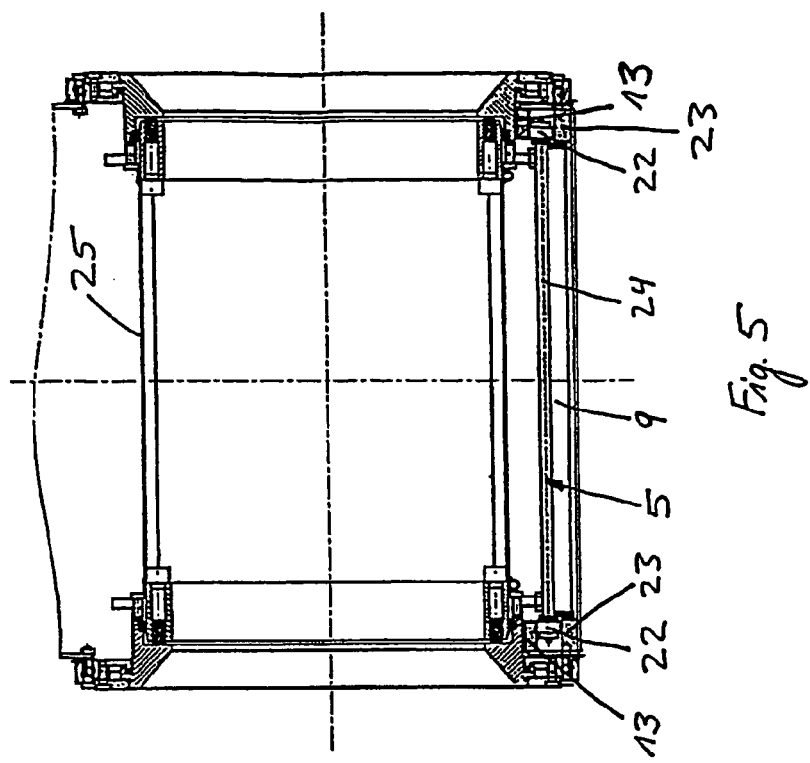
Figure 4:
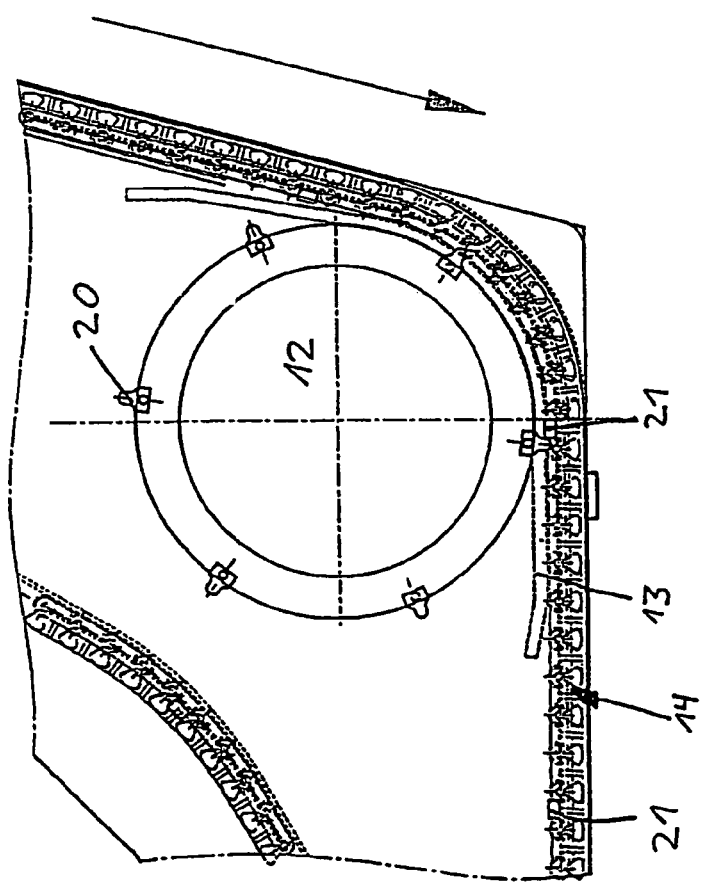
Figure 6:
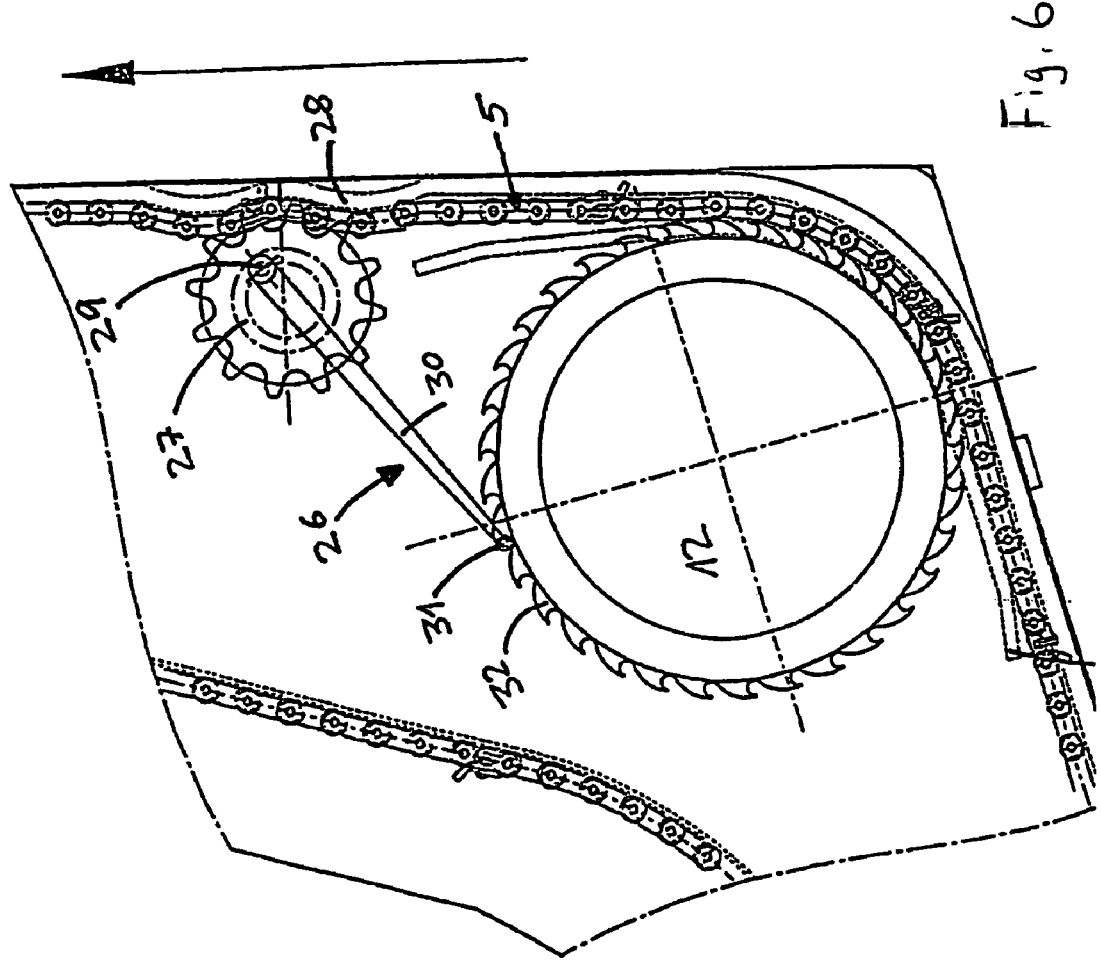
Figure 8:
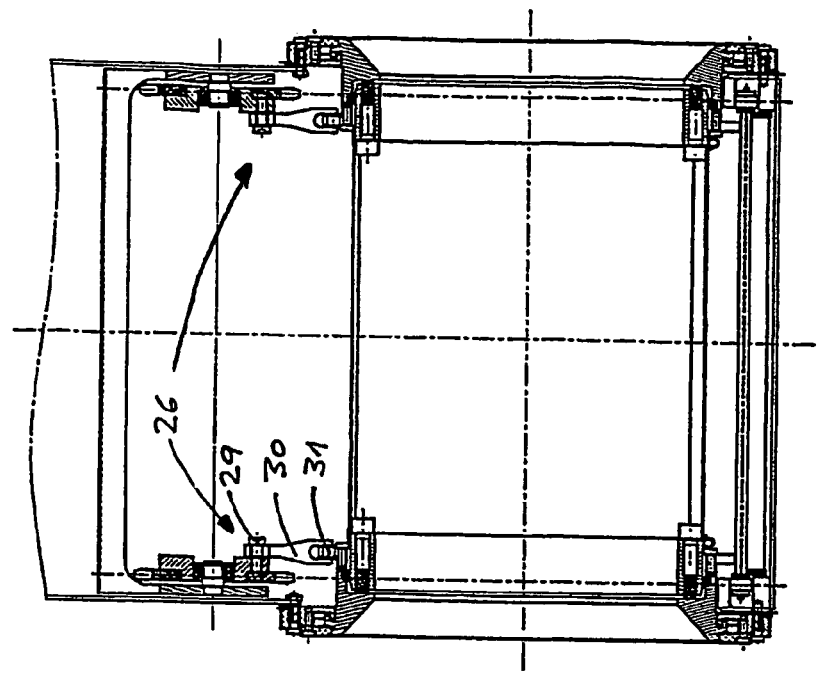
FIG. 8 shows a section through the filter drum and contiguously through the crank mechanism in accordance with the device shown in FIG. 7.
Figure 7:
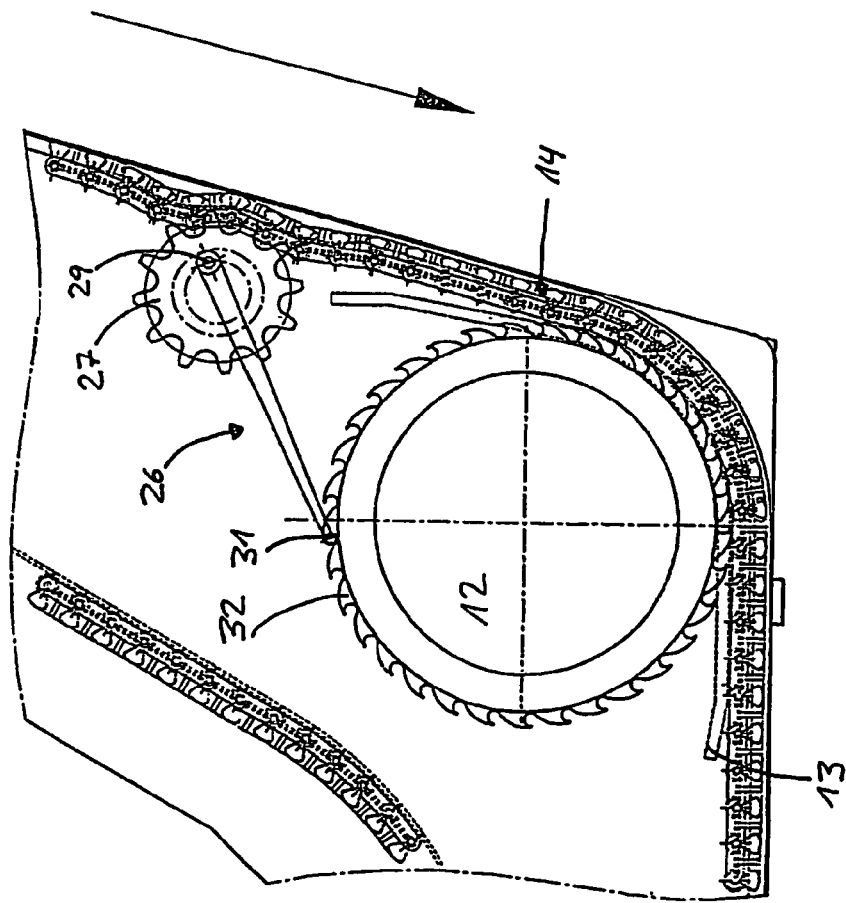
FIG. 7 shows the embodiment according to FIG. 6 with the exception that the transport element here is a hinged belt conveyor.

1 Receiving tank
2 Overflow edge
3 Guide section
4 Delivery section Scraper chain
6 Deflecting element
7 Deflecting element
8 Baffle
9 Scraper elements Side wall
11 Arrow
12 Filter drum
13 Guide rail
14 Hinged belt
15
16
17
18
19 Pin
21 Stops
22 Rollers
23 Guides
24 Retaining rod Filter wall
26 Crank mechanism
27 Gearwheel
28 Support
29 Crank pin Push rod
31 Driver element
32 Ratchet wheel

The invention claimed is:

1. A device for receiving and separating chips and cooling liquid collecting on machine tools, the cooling liquid being returned for reuse and the chips being discharged, comprising:
 a receiving tank for receiving the chips and the cooling liquid, a rising guide section adjoining the receiving tank;
 an elevated delivery section adjoining the guide section; and
 a chain-like closed transport element which, at least in the region receiving the chips and the cooling liquid and in the delivery section, is guided via at least first and second deflecting elements, wherein:
 at least one of the first and second deflecting elements is coupled to a rotary drive, and a rotatably mounted filter drum which is in drive connection with the transport element;
 the transport element is guided along the filter drum at a radial distance from the latter on guide rails, the guide rails are located between the filter drum and the transport element to define said radial distance; and
 cooperating driver elements acting only in the circumferential direction on the filter drum and arranged in each case at a distance from one another are provided on the transport element and on the filter drum.

2. The device according to claim 1, wherein the driver elements on the filter drum comprise projecting pins and the driver elements on the transport element comprise projecting stops cooperating with the pins.

3. The device according to claim 1, wherein the driver elements comprise a crank mechanism having a crank and a rod, wherein the crank is in drive connection with the transport element and the rod carries a driver element which engages in the tooth system of a ratchet wheel coupled to the filter drum.

4. The device according to claim 3, wherein the crank of the crank mechanism comprises a gearwheel and engages on rollers of the transport element.

5. The device according to claim 3 or 4, wherein the crank radius of the crank mechanism is adjustable.

6. The device according to claim 5 wherein the transport element comprises a scraper chain guided on two sides in the housing of the device and having scraper webs running transversely to the transport direction and projecting downwards in the region of the bottom strand.

7. The device according to claim 6 wherein the driver elements connected on the one hand to the transport element and on the other hand to the filter drum are provided on both sides of the transport element.

8. The device according to claim 5 wherein the transport element comprises a hinged belt conveyor guided on two sides in the housing of the device and having supporting sections running transversely to the transport direction.

9. The device according to claim 8 wherein the driver elements connected on the one hand to the transport element and on the other hand to the filter drum are provided on both sides of the transport element.

10. The device according to claim 5 wherein the driver elements connected on the one hand to the transport element and on the other hand to the filter drum are provided on both sides of the transport element.

11. The device according to one of claims 1, 2, 3, or 4, wherein the transport element comprises a scraper chain guided on two sides in the housing of the device and having scraper webs running transversely to the transport direction and projecting downwards in the region of the bottom strand.

12. The device according to claim 11 wherein the driver elements connected on the one hand to the transport element and on the other hand to the filter drum are provided on both sides of the transport element.

13. The device according to one of claims 1, 2, 3, or 4, wherein the transport element comprises a hinged belt conveyor guided on two sides in the housing of the device and having supporting sections running transversely to the transport direction.

14. The device according to claim 13 wherein the driver elements connected on the one hand to the transport element and on the other hand to the filter drum are provided on both sides of the transport element.

15. The device according to one of claims 1, 2, 3, or 4, wherein the driver elements connected on the one hand to the transport element and on the other hand to the filter drum are provided on both sides of the transport element.

* * * * *